(12) United States Patent
Houde et al.

(10) Patent No.: US 10,913,559 B2
(45) Date of Patent: Feb. 9, 2021

(54) METHOD AND SYSTEM FOR AUTOMATED STACKING AND LOADING WRAPPED FACEMASKS INTO A CARTON IN A MANUFACTURING LINE

(71) Applicant: O&M Halyard, Inc., Mechanicsville, VA (US)

(72) Inventors: Ajay Y. Houde, Johns Creek, GA (US); David Lamar Harrington, Cumming, GA (US); Mark Thomas Pamperin, Cumming, GA (US); Nathan Craig Harris, Canton, GA (US); Joseph P. Weber, Suwanee, GA (US)

(73) Assignee: O&M Halyard, Inc., Mechanicsville, VA (US)

(*) Notice: Subject to any disclaimer, the term of this patent is extended or adjusted under 35 U.S.C. 154(b) by 310 days.

(21) Appl. No.: 15/768,170

(22) PCT Filed: Oct. 16, 2015

(86) PCT No.: PCT/US2015/055878
§ 371 (c)(1),
(2) Date: Apr. 13, 2018

(87) PCT Pub. No.: WO2017/065793
PCT Pub. Date: Apr. 20, 2017

(65) Prior Publication Data
US 2018/0305046 A1    Oct. 25, 2018

(51) Int. Cl.
*B65B 9/02*    (2006.01)
*B65B 5/10*    (2006.01)
(Continued)

(52) U.S. Cl.
CPC .......... *B65B 5/105* (2013.01); *B65B 9/02* (2013.01); *B65B 9/067* (2013.01); *B65B 25/20* (2013.01);
(Continued)

(58) Field of Classification Search
CPC .......... B65B 9/02; B65B 35/18; B65B 35/26; B65G 2201/0229
(Continued)

(56) References Cited

U.S. PATENT DOCUMENTS 2,354,294 A    7/1944  Schimmel
3,123,125 A    3/1964  Lacey, Jr.
(Continued)

FOREIGN PATENT DOCUMENTS

CA    828007 A    11/1969
CA    2 325 975 A1    5/2002
(Continued)

OTHER PUBLICATIONS

International Search Report and Written Opinion for PCT/US2015/055878, dated Jun. 24, 2016, 13 pages.

*Primary Examiner* — Chelsea E Stinson
(74) *Attorney, Agent, or Firm* — Dority & Manning, P.A.

(57) ABSTRACT

An automated method and system for stacking and loading wrapped facemasks into a carton in a facemask production line include conveying individual wrapped facemasks to a delivery location adjacent to a rotary wheel, the rotary wheel conveyor having individual pick-up devices spaced around a circumference thereof. Each wrapped facemask is picked-up with a respective pick-up device on the rotary wheel conveyor and transported to a first carton staging area at a first location on the circumference of the rotary wheel. At the first staging area, the facemasks are released from the rotary wheel conveyor and deposited into a carton.

18 Claims, 6 Drawing Sheets

(51) Int. Cl.
- *B65B 25/20* (2006.01)
- *B65B 35/58* (2006.01)
- *B65B 65/00* (2006.01)
- *B65B 9/067* (2012.01)
- *B65B 35/26* (2006.01)
- *B65B 35/18* (2006.01)
- *B65B 57/14* (2006.01)
- *B65B 57/10* (2006.01)
- *B65G 47/84* (2006.01)
- *B65B 61/06* (2006.01)

(52) U.S. Cl.
CPC ............. *B65B 35/18* (2013.01); *B65B 35/26* (2013.01); *B65B 35/58* (2013.01); *B65B 57/10* (2013.01); *B65B 57/14* (2013.01); *B65B 65/003* (2013.01); *B65G 47/848* (2013.01); *B65B 61/06* (2013.01); *B65B 2210/02* (2013.01); *B65B 2220/18* (2013.01); *B65G 2201/0229* (2013.01)

(58) Field of Classification Search
USPC .......................................................... 53/449
See application file for complete search history.

(56) References Cited

U.S. PATENT DOCUMENTS

| | | |
|---|---|---|
| 3,242,783 A | 3/1966 | Sehmermund |
| 3,670,474 A | 6/1972 | Vieson et al. |
| 3,800,640 A | 4/1974 | Barrie |
| 3,847,046 A | 11/1974 | Schmermund |
| 3,926,097 A | 12/1975 | Santa Maria et al. |
| 3,958,390 A | 5/1976 | Pringle, Jr. et al. |
| 3,960,096 A | 6/1976 | Zobel |
| 3,971,369 A | 7/1976 | Aspelin et al. |
| 3,983,774 A | 10/1976 | Seragnoli |
| 4,111,411 A | 9/1978 | Graves et al. |
| 4,261,457 A | 4/1981 | van Maanen |
| 4,269,315 A | 5/1981 | Boyce |
| 4,440,289 A | 4/1984 | Weis |
| 4,467,589 A | 8/1984 | van Maanen |
| 4,525,977 A | 7/1985 | Matt |
| 4,543,152 A | 9/1985 | Nozaka |
| 4,549,386 A | 10/1985 | Wilson |
| 4,550,856 A | 11/1985 | Ballmann et al. |
| 4,630,310 A | 12/1986 | Winesett |
| 4,662,005 A | 5/1987 | Grier-Idris |
| 4,722,168 A | 2/1988 | Heaney |
| 4,809,481 A | 3/1989 | Früh et al. |
| 5,079,902 A | 1/1992 | Seko et al. |
| 5,117,614 A | 6/1992 | Johnsen |
| 5,155,967 A | 10/1992 | Branson |
| 5,170,610 A | 12/1992 | Tisma |
| 5,322,061 A | 6/1994 | Brunson |
| 5,548,946 A | 8/1996 | Holub |
| 5,615,767 A | 4/1997 | Eull et al. |
| 5,647,190 A * | 7/1997 | Minarelli ................ B65B 17/02 198/377.08 |
| 5,724,677 A | 3/1998 | Bryant et al. |
| 5,727,369 A | 3/1998 | Mosse |
| 5,921,375 A | 7/1999 | Van Laar |
| 6,098,785 A | 8/2000 | Van Maanen |
| 6,117,515 A | 9/2000 | Brunson et al. |
| 6,122,898 A | 9/2000 | De Kort |
| 6,123,077 A | 9/2000 | Bostock et al. |
| 6,125,849 A | 10/2000 | Williams et al. |
| 6,173,712 B1 | 1/2001 | Brunson |
| 6,174,397 B1 | 1/2001 | Johnson |
| 6,311,824 B1 * | 11/2001 | Van Pul ............... B65G 47/848 198/370.12 |
| 6,394,090 B1 | 5/2002 | Chen et al. |
| 6,524,423 B1 | 2/2003 | Hilt et al. |
| 6,729,103 B1 | 5/2004 | Hartness et al. |
| 6,868,984 B2 | 3/2005 | Griesbach, III et al. |
| 6,886,563 B2 * | 5/2005 | Bostock ............... A62B 23/025 128/206.19 |
| 7,703,260 B1 | 4/2010 | Watkins |
| 8,061,356 B2 | 11/2011 | Bowen |
| 8,061,960 B2 | 11/2011 | Hopwood et al. |
| 8,700,214 B2 | 4/2014 | Fortman |
| 9,150,382 B2 | 10/2015 | Allen et al. |
| 10,227,202 B2 | 3/2019 | Pamperin et al. |
| 10,492,547 B2 | 12/2019 | Weber et al. |
| 2002/0095913 A1 | 7/2002 | Honegger |
| 2003/0000805 A1 | 1/2003 | Wild et al. |
| 2003/0010422 A1 | 1/2003 | Starkey |
| 2004/0121107 A1 | 6/2004 | Bell et al. |
| 2004/0144619 A1 | 7/2004 | Ohiro et al. |
| 2004/0262127 A1 | 12/2004 | Harnish et al. |
| 2005/0166733 A1 | 8/2005 | Piscitello |
| 2006/0070353 A1 | 4/2006 | Van Dam |
| 2008/0072721 A1 | 3/2008 | Kern |
| 2008/0251210 A1 | 10/2008 | Chen |
| 2018/0305058 A1 * | 10/2018 | Maruyama ............... B65B 57/16 |
| 2019/0210755 A1 * | 7/2019 | Spencer .................. B65B 25/20 |

FOREIGN PATENT DOCUMENTS

| | | |
|---|---|---|
| CN | 104872866 A | 9/2015 |
| CN | 104939377 A | 9/2015 |
| DE | 3736868 A1 | 5/1989 |
| EP | 0 257 852 A2 | 3/1988 |
| EP | 0 622 298 A1 | 11/1994 |
| EP | 0 640 526 A1 | 3/1995 |
| EP | 0 791 537 A1 | 8/1997 |
| EP | 0 806 343 A2 | 11/1997 |
| EP | 0 894 752 A1 | 2/1999 |
| EP | 1 048 595 A1 | 11/2000 |
| EP | 1 757 552 A2 | 2/2007 |
| EP | 1 840 033 A2 | 10/2007 |
| EP | 2 484 611 A2 | 8/2012 |
| EP | 2 757 062 A1 | 7/2014 |
| EP | 2 801 790 A1 | 11/2014 |
| FR | 1 588 621 | 4/1970 |
| GB | 364557 | 12/1931 |
| GB | 1 216 310 | 12/1970 |
| GB | 1 232 053 | 5/1971 |
| GB | 1 361 496 | 7/1974 |
| GB | 2 092 090 A | 8/1982 |
| GB | 2 436 728 A | 10/2007 |
| JP | S 62103536 U | 7/1987 |
| JP | H04311405 A | 11/1992 |
| JP | H05-78007 A | 3/1993 |
| JP | H05170209 A | 7/1993 |
| JP | H06211214 A | 8/1994 |
| JP | 2000198600 A | 7/2000 |
| JP | 2002052487 A | 2/2002 |
| JP | 2005272512 A | 10/2005 |
| JP | 2006-206085 A | 8/2006 |
| JP | 2007084309 A | 4/2007 |
| JP | 2008055035 A | 3/2008 |
| JP | 2009286490 A | 12/2009 |
| JP | 2011178459 A | 9/2011 |
| JP | 2011200510 A | 10/2011 |
| JP | 2012201409 A | 10/2012 |
| JP | 2013230380 A | 11/2013 |
| JP | 6062584 B1 * | 1/2017 ............. B65B 35/08 |
| KR | 100550225 B1 | 2/2006 |
| WO | WO 97/32494 | 9/1997 |
| WO | WO 99/24119 A1 | 5/1999 |
| WO | WO 02/28760 A1 | 4/2002 |
| WO | WO 2005/054106 A1 | 6/2005 |

* cited by examiner

METHOD AND SYSTEM FOR AUTOMATED STACKING AND LOADING WRAPPED FACEMASKS INTO A CARTON IN A MANUFACTURING LINE

FIELD OF THE INVENTION

The present invention relates generally to the field of protective facemasks, and more specifically to a method and system for stacking and packaging wrapped facemask in the manufacturing line of such facemasks.

FAMILY OF RELATED APPLICATIONS

The present application is related by subject matter to the following concurrently filed PCT applications (all of which designate the US):

a. International Application No.: PCT/US2015/055858; entitled "Method and System for Splicing Nose Wire in a Facemask Manufacturing Process".

b. International Application No.: PCT/US2015/055861; entitled "Method and System for Splicing Nose Wire in a Facemask Manufacturing Process".

c. International Application No.: PCT/US2015/055863; entitled "Method and System for Introducing a Reserve Nose Wire in a Facemask Production Line".

d. International Application No.: PCT/US2015/055865; entitled "Method and System for Cutting and Placing Nose Wires in a Facemask Manufacturing Process".

e. International Application No.: PCT/US2015/055867; entitled "Method and System for Placing Nose Wires in a Facemask Manufacturing Process".

f. International Application No.: PCT/US2015/055871; entitled "Method and System for Placing Nose Wires in a Facemask Manufacturing Process".

g. International Application No.: PCT/US2015/055872; entitled "Method and System for Placing Nose Wires in a Facemask Manufacturing Process".

h. International Application No.: PCT/US2015/055876; entitled "Method and System for Wrapping and Preparing Facemasks for Packaging in a Facemask Manufacturing Line".

j. International Application No.: PCT/US2015/055882; entitled "Method and System for Automated Stacking and Loading of Wrapped Facemasks into a Carton in a Facemask Manufacturing Line".

The above cited applications are incorporated herein by reference for all purposes. Any combination of the features and aspects of the subject matter described in the cited applications may be combined with embodiments of the present application to yield still further embodiments of the present invention.

BACKGROUND OF THE INVENTION

Various configurations of disposable filtering facemasks or respirators are known and may be referred to by various names, including "facemasks", "respirators", "filtering face respirators", and so forth. For purposes of this disclosure, such devices are referred to generically as "facemasks."

The ability to supply aid workers, rescue personnel, and the general populace with protective facemasks during times of natural disasters or other catastrophic events is crucial. For example, in the event of a pandemic, the use of facemasks that offer filtered breathing is a key aspect of the response and recovery to such event. For this reason, governments and other municipalities generally maintain a ready stockpile of the facemasks for immediate emergency use. However, the facemasks have a defined shelf life, and the stockpile must be continuously monitored for expiration and replenishing. This is an extremely expensive undertaking.

Recently, investigation has been initiated into whether or not it would be feasible to mass produce facemasks on an "as needed" basis during pandemics or other disasters instead of relying on stockpiles. For example, in 2013, the Biomedical Advanced Research and Development Authority (BARDA) within the Office of the Assistant Secretary for Preparedness and Response in the U.S. Department of Health and Human Services estimated that up to 100 million facemasks would be needed during a pandemic situation in the U.S., and proposed research into whether this demand could be met by mass production of from 1.5 to 2 million facemasks per day to avoid stockpiling. This translates to about 1,500 masks/minute. Current facemask production lines are capable of producing only about 100 masks/minute due to technology and equipment restraints, which falls far short of the estimated goal. Accordingly, advancements in the manufacturing and production processes will be needed if the goal of "on demand" facemasks during a pandemic is to become a reality.

In conventional facemask production lines, once the facemasks have been cut and wrapped, manual labor is necessary to align, stack, and place the masks in a carton. These manual steps are a significant impediment to mass production of the facemasks at the throughputs mentioned above.

The present invention addresses this need and provides a method for high speed aligning and stacking of wrapped facemasks into a carton for further high speed packaging.

SUMMARY OF THE INVENTION

Objects and advantages of the invention will be set forth in the following description, or may be obvious from the description, or may be learned through practice of the invention.

In accordance with aspects of the invention, an automated method is provided for stacking and placing wrapped or unwrapped facemasks into a carton in a facemask production line. Individual wrapped or unwrapped facemasks are conveyed in a continuous stream to a delivery location at a rotary wheel conveyor having individual pick-up devices spaced around a circumference thereof. As the rotary wheel conveyor rotates by the delivery location, each individual wrapped facemask is picked up by a respective pick-up device and is transported by the rotary wheel conveyor to a first carton staging area at a first location on the circumference of the rotary wheel. At this first staging area, the facemasks are sequentially released by the pick-up devices and are deposited into a carton.

In a particular embodiment, the method includes staging a plurality of the cartons at the first staging area, and when the carton is filled with a predefined number of the facemasks, the filled carton is moved from the first staging area and an empty carton is moved into the first staging area for subsequent filling. Desirably, this transfer of cartons is done without disrupting or slowing pick-up of the facemasks by the rotary wheel.

In certain embodiments, the method may include providing a second staging area at a second location on the circumference of the rotary wheel, and staging a second carton at the second staging area. With this configuration, when the first carton is filled to a predefined number of the facemasks, the discharge position of the rotary wheel conveyor can be indexed to the second staging area wherein the second carton can be filled with a defined number of the facemasks without interruption or slow-down of the production line. With this embodiment, the first and second cartons may have a different size and are filled with a different number of facemasks, which adds significant versatility to the production line.

With certain mask types, it is desired that the masks are arranged in an alternating stacked pattern in the carton. In this regard, the method may also include rotating individual facemasks on the rotary wheel conveyor with the pick-up devices as needed to ensure that the facemasks are deposited into the carton in the desired alternating stack pattern.

In certain production lines, the facemasks may be conveyed to the delivery location at the rotary wheel conveyor in an initial transversely offset configuration relative to a conveying axis of the conveyor. The method may include aligning the facemasks along a common conveying axis by removing the offset between adjacent facemasks as the facemasks are conveyed along the production line prior to reaching the rotary wheel.

In a particular equipment configuration, the rotary wheel conveyor is operationally disposed above the wrapped facemasks in the production line, and the pick-up devices are vacuum pucks spaced around an underside of the rotary wheel. The wrapped facemasks are drawn onto the pucks as the pucks pass overhead at the delivery location. At the first or second staging areas, the pucks release the facemasks, which can fall by gravity or be guided into the carton. The pucks may be rotatable relative to the rotary wheel, wherein the method further includes rotating the facemasks on the rotary wheel conveyor as needed to achieve a desired stacking pattern at the staging areas.

In an alternate embodiment, the pick-up devices are stationary relative to the rotary wheel conveyor such that the facemasks are deposited into the carton in an orientation in which the facemasks were picked up by the pick-up devices. Thus, with this embodiment, the facemasks are in an initial alternating pattern when picked up by the pick-up devices, and are deposited into the carton in this initial alternating pattern.

In the event that a facemask on the rotary wheel conveyor is determined to be unacceptable, the associated pick-up device of such facemask is controlled so as not to release the facemask at the carton staging area. The facemask is transported to a reject location and then released. If this occurs, in order to maintain the desired alternating stacking pattern at the staging area, the subsequent facemasks can be rotated by the pick-up devices on the rotary wheel. In the embodiment where the pick-up devices are stationary relative to the rotary wheel, the method may include also bypassing the carton with the facemask immediately adjacent to the rejected facemask on the rotary wheel conveyor so as to keep the alternating stack pattern of facemasks deposited into the carton. These same techniques can be used if a facemask falls off of the rotary wheel conveyor prior to reaching the staging area, or a pick-up device fails to acquire a facemask at the delivery location.

The present invention also encompasses various system embodiments for automated stacking and placing of wrapped facemasks into a carton in a facemask production line in accordance with the present methods, as described and supported herein.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

As mentioned, the present methods relate to stacking and loading individually wrapped facemasks into a carton in an automated production line. The current methods will reduce the time spent on these processes as compared to current production lines, and thus contribute to achieving the production throughputs necessary for on-demand facemasks during extreme situations (e.g., a pandemic or natural disaster). It should be appreciated that the upstream production steps for forming and wrapping the individual facemasks are not limiting aspects of the invention and, thus, will not be explained in great detail herein.

Also, the present disclosure refers to or implies conveyance or transport of certain components of the facemasks through the production line. It should be readily appreciated that any manner and combination of article conveyors (e.g., rotary and linear conveyors), article placers (e.g. vacuum puck placers), and transfer devices are well known in the article conveying industry and can be used for the purposes described herein. It is not necessary for an understanding and appreciation of the present methods to provide a detailed explanation of these well-known devices and system.

Various styles and configurations of facemasks, including generally trapezoidal cone masks and flat pleated facemasks are well-known, and the present methods may have utility in the production lines for these conventional masks. For illustrative purposes only, aspects of the present method are described herein with reference to a particular type of trapezoidal respirator facemask often referred to in the art as a "duckbill" mask, as illustrated in FIG. 1.

Figure 1:
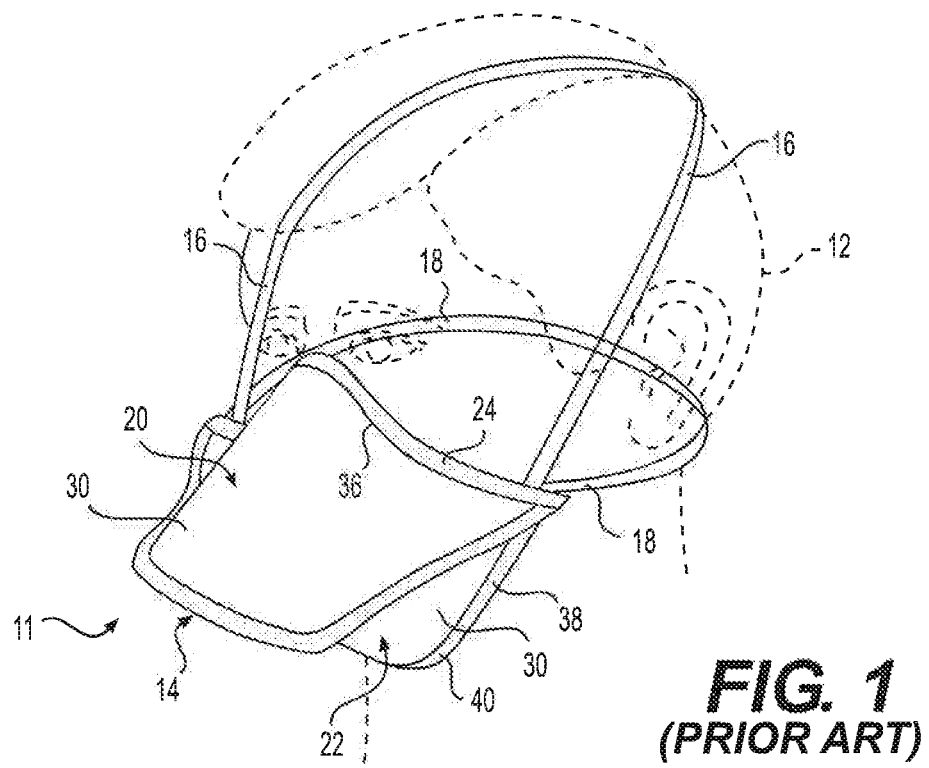
FIG. 1 is a perspective view of a conventional respiratory facemask worn by a user, the facemask incorporating a nose wire to conform the facemask to the user's face.
Figure 2:
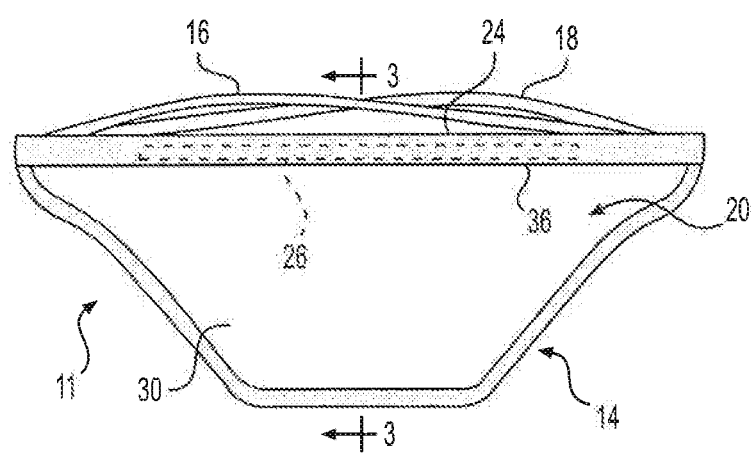
FIG. 2 is a top view of the conventional facemask of FIG. 1 is a folded state.

Referring to FIGS. 1 and 2, a representative facemask 11 (e.g., a duckbill facemask) is illustrated on the face of wearer 12. The mask 11 includes filter body 14 that is secured to the wearer 12 by means of resilient and elastic straps or securing members 16 and 18. The filter body 14 includes an upper portion 20 and a lower portion 22, both of which have complimentary trapezoidal shapes and are preferably bonded together such as by heat and/or ultrasonic sealing along three sides. Bonding in this manner adds important structural integrity to mask 11.

The fourth side of the mask 11 is open and includes a top edge 24 and a bottom edge 38, which cooperate with each other to define the periphery of the mask 11 that contacts the wearer's face. The top edge 24 is arranged to receive an elongated malleable member 26 (FIG. 2) in the form of a flat metal ribbon or wire (referred to herein as a "nose wire"). The nose wire 26 is provided so that top edge 24 of mask 11 can be configured to closely fit the contours of the nose and cheeks of wearer 12. The nose wire 26 is typically constructed from an aluminum strip with a rectangular cross-section. With the exception of having the nose wire 26 located along top edge 24 of the upper portion 20 of the mask 11, the upper and lower portions 20 and 22 may be identical.

As shown in FIG. 1, the mask 11 has the general shape of a cup or cone when placed on the face of wearer 12 and thus provides "off-the-face" benefits of a molded-cone style mask while still being easy for wearer 12 to carry mask 11 in a pocket prior to use. "Off-the-face" style masks provide a larger breathing chamber as compared to soft, pleated masks which contact a substantial portion of the wearer's face. Therefore, "off-the-face" masks permit cooler and easier breathing.

Blow-by associated with normal breathing of wearer 12 is substantially eliminated by properly selecting the dimension and location of the nose wire 26 with respect to top edge of 24. The nose wire 26 is preferably positioned in the center of top edge 24 and has a length in the range of fifty percent (50%) to seventy percent (70%) of the total length of the top edge 24.

The upper and lower portions 20 and 22 may include multiple layers and each have an outer mask layer 30 and inner mask layer. Located between the outer and inner mask layers are one or more intermediate filtration layers that are typically constructed from a melt-blown polypropylene, extruded polycarbonate, melt-blown polyester, or a melt-blown urethane.

The top edge 24 of the mask 11 is faced with an edge binder 36 that extends across the open end of mask 11 and covers the nose wire 26. Similarly, the bottom edge 38 is encompassed by an edge binder 40. Edge binders 36 and 40 are folded over and bonded to the respective edges 24, 38 after placement of the nose wire 26 along the top edge 24. The edge binders 36, 40 may be constructed from a spun-laced polyester material.

Figure 3:
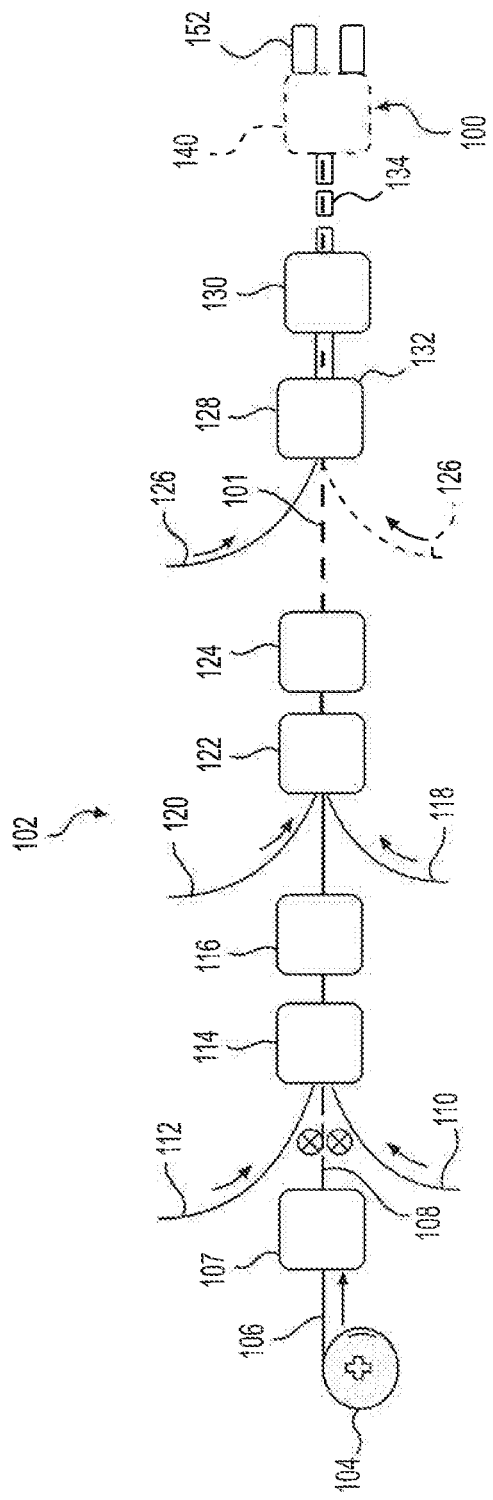
FIG. 3 is a schematic representation of facemask production line in which embodiments of the present method may be incorporated.

FIG. 3 depicts portions of a generic production line 102 for automated, in-line production of individual facemasks. It should be appreciated that the various processes, equipment, controls, etc., can vary greatly between different production lines 102, and that FIG. 3 is presented for illustrative purposes only. The methods described herein will have utility in many different types of production lines 102.

FIG. 3 represents a production line 102 wherein nose wires are incorporated into an edge of the facemasks. A running nose wire 106 is supplied in continuous strip form from a source, such as a driven spool or roll 104, to a cutting station 107 wherein the wire 106 is cut into individual nose wires 108 having a defined length. Suitable cutting stations 108 are known and used in conventional production lines.

The nose wires 108 are conveyed onto a carrier web 110, which, referring to FIG. 2, may be the continuous multi-layer web that defines the upper body portion 20 of the finished face mask 11. The individual nose wires 108 are deposited along the edge of the carrier web 110 corresponding to the top edge 24 of the facemask 11 in FIG. 2.

After placement of the individual nose wires 108 in position on the carrier web 110, a binder web 112 is introduced to the production line 102 along both edges of the carrier web 110 (only one binder web 112 is depicted in FIG. 3.). The combination of carrier web 110, nose wire 108, and binder webs 112 pass through a folding station 114 wherein the binder webs 112 are folded around the respective running edges of the carrier web 110. The components then pass through a bonding station 116 wherein the binder webs 112 are thermally bonded to the carrier web 110, thereby producing the edge configurations 24, 38 depicted in FIGS. 1 and 2. The nose wire 108 is essentially encapsulated along the top edge 24 by the binder web 112.

From the bonding station 116, the continuous combination of carrier web 110 with nose wires 108 encapsulated in the binder 112 is conveyed to another bonding station 122. At this station, an additional web 118 is introduced that corresponds to the lower panel portion 22 of the face mask 11 depicted in FIGS. 1 and 2. This web 118 may already have the binder web applied to the edge thereof from an upstream process. Continuous elastomeric straps 120 are also introduced and are laid between the edges of the web 118 and web 110 corresponding to the edges 24, 28 in FIG. 1. The materials are bonded together in a bond pattern that corresponds to the trapezoidal shape of the facemask 11 with a closed end and an open end at the edges 24, 28.

The bonded webs 110 and 118 (with nose wires and straps) are conveyed to a cutting station 124 wherein the individual facemasks 101 are cut out from the webs along the bond lines.

The facemasks 101 are then conveyed to a bonding station 128 wherein wrapping materials 126 (e.g. a poly material) are introduced and are folded (if necessary) and bonded around the individual facemasks 101. A single web of the wrapping material 126 may be folded around the facemasks and sealed along a continuous longitudinal bond line or, in an alternate embodiment depicted by the dashed line in FIG. 3, an additional web of the wrapping material 126 may be introduced to the bonding station, wherein the facemasks are sandwiched between the two webs 126. The webs 126 are then sealed along continuous longitudinal bond lines along their mating edges.

A continuous stream of wrapped facemasks 132 emerge from the bonding station 128 and are conveyed to a cutting station 130 wherein cuts are made in the bonded wrapping material in a desired pattern to produce individual wrapped facemasks 134. These masks 134 are conveyed to downstream processing stations 136 for further processing, including stacking and packaging.

With further reference to FIGS. 4 through 7, embodiments of a method 100 are depicted that relate to the stacking and loading processes at station 140.

Figure 4:
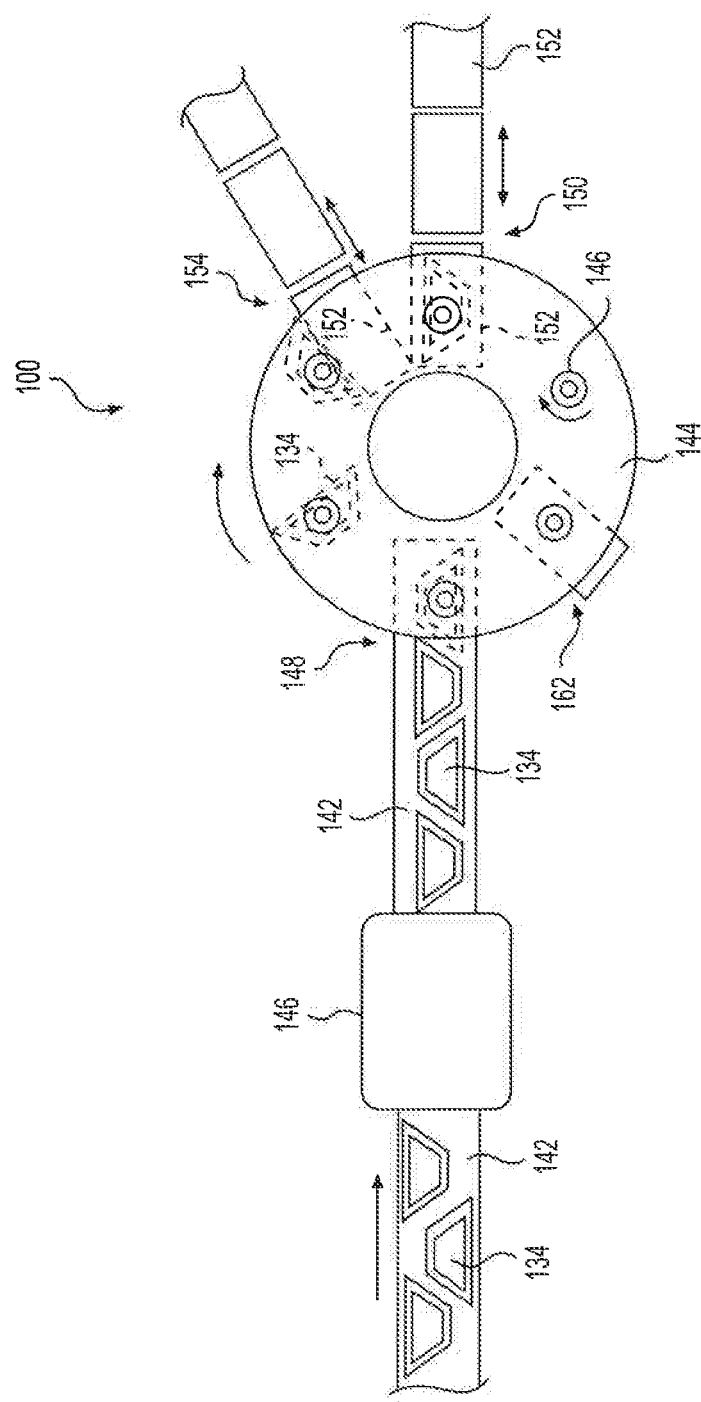
FIG. 4 is a schematic representation of aspects in accordance with the present invention for stacking and loading facemasks into a carton in a production line.

Referring to the embodiment of FIG. 4, individual wrapped facemasks 134 are conveyed by a conveyor 142 in a continuous stream to a delivery location 148. A rotary wheel conveyor 144 is operationally disposed at the delivery location 148 and includes a plurality of individual pick-up devices 146 spaced around a circumference thereof. Various types of pick-up devices 146 are well known in the article conveying industry, and any one or combination of such conventional devices may be used with the current method 100. For example, the pick-up devices 146 may be vacuum pucks, mechanical graspers, suction devices, and so forth. In the illustrated embodiments, the pick-up devices 146 are vacuum pucks and the rotary conveyor 144 operates above the conveyor 142 and facemasks 134.

As the rotary wheel conveyor 144 rotates by the delivery location 148, each individual wrapped facemask 134 is picked up by a respective pick-up device 146 and is transported by the rotary wheel conveyor 144 to a first carton staging area 150 at a first location on the circumference of the rotary wheel 144. At this first staging area 150, the facemasks 134 are sequentially released by the pick-up devices 146 and are deposited into a carton 152.

In a particular embodiment, the method 100 includes staging a plurality of the cartons 152 at the first staging area 150, and when the carton 152 is filled with a predefined number of the facemasks 134, the filled carton is moved from the first staging area 150 and an empty carton 152 is moved into the first staging area 150 for subsequent filling. Desirably, this transfer of cartons 152 is done without disrupting or slowing pick-up of the facemasks 134 by the rotary wheel 144.

Depending on the processing speed of the line, and the rotational speed of the rotary conveyor 144 in particular, the facemasks 134 may have a tendency to "sling" away from the conveyor 144 upon release at the staging area 150. In this regard, the pick-up devices 146 may be further configured to impart a downward force to the facemasks 134 upon release thereof to ensure that the facemasks 134 fall into a carton 152 staged below the pick-up device. For example, in the embodiment wherein the pick-up devices are vacuum pucks, upon releasing the facemasks, the pucks may initiate a jet of pressurized air that blows the masks downwardly into the carton 152. In the embodiment wherein the pick-up devices 146 are mechanical, for example graspers, a mechanical member may come into play upon release of the facemasks to impart the downward force to the facemasks 134.

Still referring to FIG. 4, the method 100 may include providing a second staging area 154 at a second location on the circumference of the rotary wheel conveyor 144, and staging one or more second cartons 152 at the second staging area 154. With this configuration, when the first carton 152 is filled to a predefined number of the facemasks 134 at the first staging area 150, the discharge position of the rotary wheel 144 can be indexed to the second staging area 154 wherein the second carton 152 can be filled with a defined number of the facemasks 134 without interruption or slowdown of the production line 102.

The embodiment of FIG. 4 may be particularly useful in that the first and second cartons 152 may have a different size and are filled with a different number of facemasks, which adds significant versatility to the production line 102.

With certain mask types, it is desired that the facemasks 134 are arranged in an alternating stacked pattern in the carton 152. In this regard, the pick-up devices 146 may be rotatable on the rotary wheel conveyor 144, and the method 100 may also include rotating individual facemasks 134 on the rotary wheel 144 with the pick-up devices 146 as needed to ensure that the facemasks 134 are deposited into the carton 152 in the desired an alternating stack pattern. In this embodiment, the pick-up devices 46 may be independently driven and controlled by a controller. Alternatively, the pick-up devices may simply allow for rotation of the facemasks 134 by means of a guide, cam, or cylinder that is actuated to contact the facemasks 134 or pick-up devices and cause rotation thereof.

As depicted in FIG. 4, in certain production lines, the facemasks 134 may be conveyed to the delivery location 148 at the rotary wheel conveyor 144 in an initial transversely offset alternating configuration relative to a conveying axis of the conveyor 142. The method 100 may include aligning edges of the facemasks 134 at an alignment station 160 so that the facemasks lie along a common conveying axis by removing the offset between adjacent facemasks 134 as the facemasks are conveyed through the station 160 prior to reaching the rotary wheel conveyor 144. The facemasks 134 may be aligned at the station 160 by guides positioned along the conveying path, or by an active device, such as a vacuum puck placer that picks up and repositions the facemasks 134.

Figure 5:
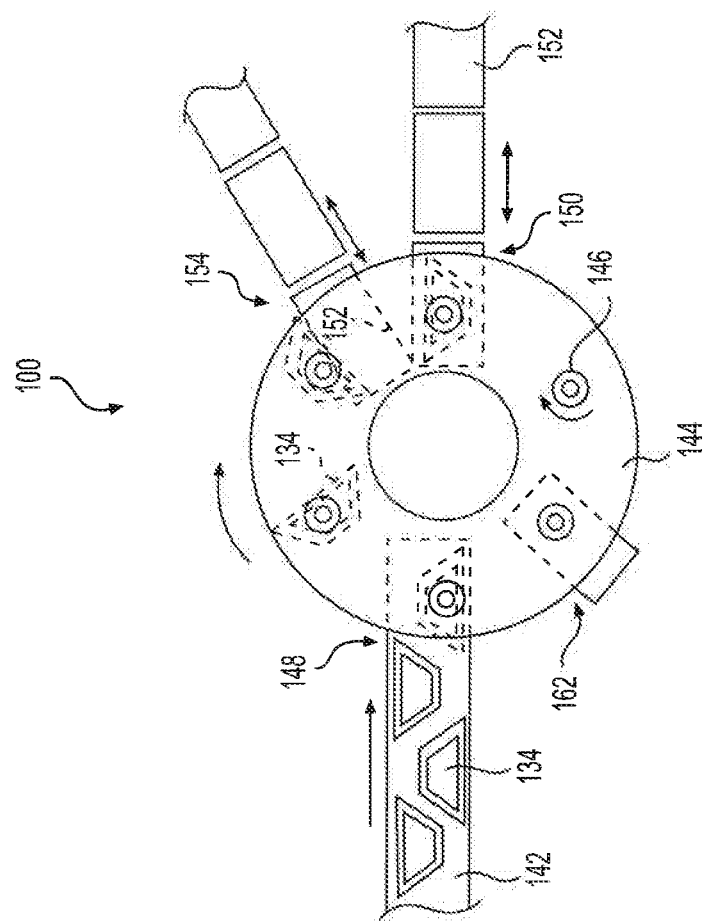
FIG. 5 is a schematic representation of aspects of other aspects in accordance with the present invention for stacking and loading facemasks into a carton in a production line.

As mentioned, in a particular equipment configuration illustrated in FIGS. 4 and 5, the rotary wheel conveyor 144 is operationally disposed above the wrapped facemasks 134 in the production line, and the pick-up devices 146 are vacuum pucks spaced around an underside of the rotary wheel 144. The wrapped facemasks 134 are drawn onto the pucks 146 as the pucks pass overhead at the delivery location 148. At the first or second staging areas 150, 154, the pucks 146 release the facemasks 134, which can fall by gravity or be guided into the cartons 152. As mentioned, the pucks 146 may be rotatable relative to the rotary wheel 144, wherein the method 100 further includes rotating the facemasks 134 on the rotary wheel conveyor as needed to achieve a desired stacking pattern at the staging areas 150, 154.

In an alternate embodiment of the method 100, the pick-up devices 146 are stationary relative to the rotary wheel conveyor 146 such that the facemasks 134 are deposited into the carton 152 in an orientation in which the facemasks were picked up at the delivery location 148. Thus, with this embodiment, the facemasks 134 are in an initial alternating pattern when picked up by the pick-up devices 146, and are deposited into the carton 152 in this initial alternating pattern.

With the above embodiment, in the event that a facemask on the rotary wheel conveyor 144 is determined to be unacceptable, the associated pick-up device 146 of such facemask is controlled so as not to release the facemask 134 at the carton staging area, but to transport the facemask 134 to an alternate location 162 and then release the mask. If this occurs, in order to maintain the desired alternating stacking pattern at the staging area 150, 154, the subsequent facemask 134 can be rotated by the pick-up devices on the rotary wheel to the correct alternated position.

The alternate location 162 (or an additional alternate location staged at the periphery of the rotary conveyor 144) may also be used to deposit good (i.e., not reject) facemasks, for example when the staging area 150 is inoperable for some reason and it is not desirable to shut down the upstream production line.

In the embodiment where the pick-up devices 146 are stationary relative to the rotary wheel conveyor 144, the method 100 may include also bypassing the staging area 150, 154 with the facemask 134 immediately adjacent to the rejected facemask on the rotary wheel 144 (and possibly rejecting this mask) so as to keep the alternating stack pattern of facemasks deposited into the carton 152. These same techniques can be used if a facemask 134 falls off of the rotary wheel prior to reaching the staging area 150, 154, or a pick-up device 146 fails to acquire a facemask 134 at the delivery location 148.

Figure 6:
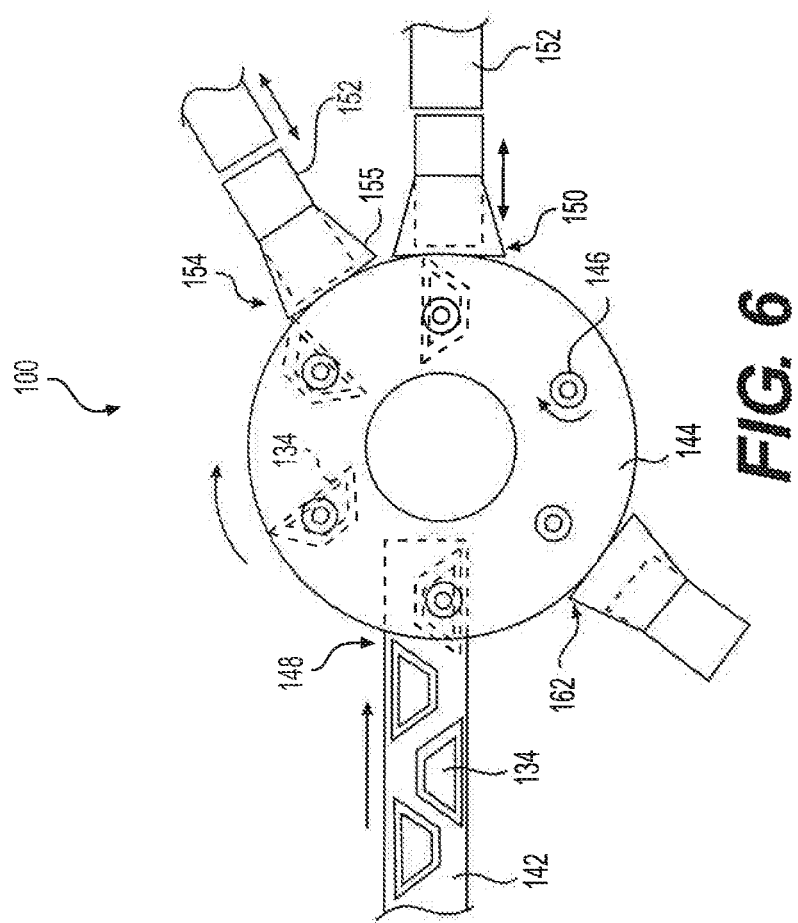
FIG. 6 is a schematic representation of aspects of another embodiment in accordance with the present invention.

As mentioned above with respect to FIG. 4, depending on the centrifugal forces generated by the rotary conveyor 144, the facemask 134 may have a tendency to sling away from the conveyor at the staging areas 150, 154. FIG. 6 illustrates an embodiment wherein the cartons 152 are not staged directly under the release position of the pick-up devices 146, but are spaced radially outward from the conveyor at the staging areas 150, 154. Guide structure 155, such as angled chute 155 are configured at the staging areas such that, upon release, the facemasks 134 are thrown into the chute 155, which has a shape and angular orientation to direct the facemasks into the carton 152 at the desired stacking orientation.

Figure 7:
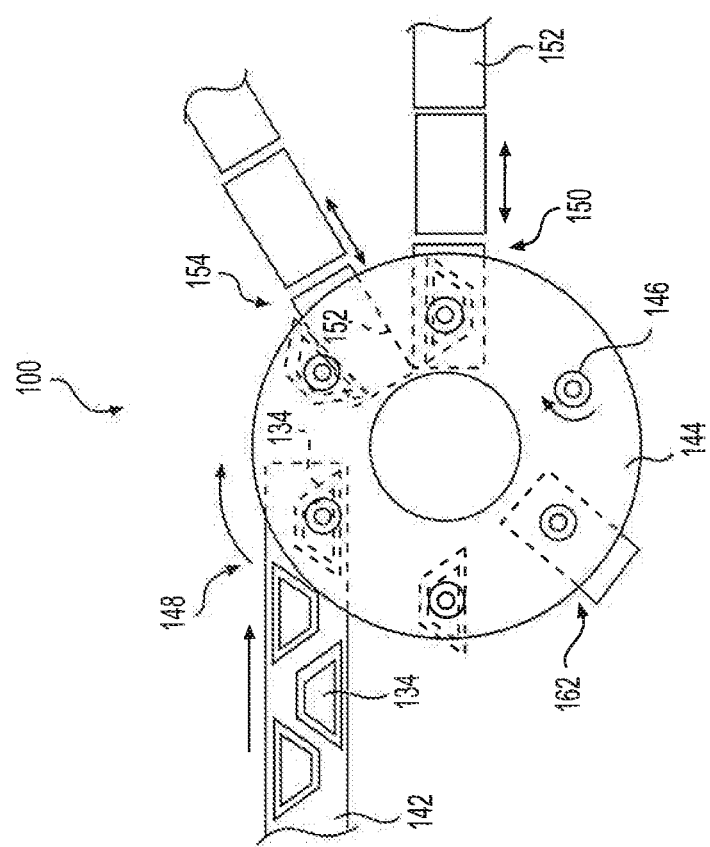
FIG. 7 is a schematic representation of still a further embodiment is accordance with the present invention.

FIG. 7 depicts an embodiment wherein the conveyor 142 and delivery location 148 are operationally located at a circumferential position on the conveyor 144 that minimized travel time and distance to the staging areas 150, 154. Not only is there a time savings between delivery to the conveyor 144 and release into a carton 152, but centrifugal forces acting on the facemasks 134 at the time of release may also be minimized.

It should be appreciated that the methods and systems described herein are not limited to stacking and loading wrapped facemasks. The present invention is just as applicable to stacking and loading unwrapped facemasks. Although the embodiments described herein relate to wrapped facemasks, it is intended that the invention encompass the same methods and systems for stacking and loading unwrapped facemasks. For example, in the embodiment of FIG. 4, unwrapped facemasks could be conveyed by conveyor 142 to the rotary conveyor 144, and then processed as described herein.

As mentioned, the present invention also encompasses various system embodiments for automated stacking and loading wrapped facemasks into a carton in a facemask production line in accordance with the present methods. Aspects of such systems are illustrated in the figures, and described and supported above.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An automated method for stacking and loading facemasks into a carton in a facemask production line, comprising:
   conveying individual facemasks to a delivery location adjacent to a rotary wheel conveyor having a plurality of individual pick-up devices spaced around a circumference thereof, the rotary wheel conveyor rotating in a horizontal plane about a vertical axis;
   as the rotary wheel conveyor rotates by the delivery location, picking up each facemask with a respective pick-up device on the rotary wheel conveyor that moves over the facemasks and transporting the facemasks to a first carton staging area at a first location on the circumference of the rotary wheel conveyor;
   at the first carton staging area, releasing the facemasks from the rotary wheel conveyor and depositing the facemasks into a carton as the rotary wheel conveyor rotates by the first staging area; and
   staging a plurality of the cartons at the first staging area, and when the carton is filled with a predefined number of the facemasks, moving the filled carton from the first staging area and moving an empty carton into the first staging area for subsequent filling.

2. The method as in claim 1, further comprising providing a second staging area at a second location on the circumference of the rotary wheel, and staging a second carton at the second staging area, wherein when the first carton is filled to a predefined number of the facemasks, transporting the facemasks with the rotary wheel conveyor to the second staging area and filling the second carton with a defined number of the facemasks.

3. The method as in claim 2, wherein the first and second cartons have a different size and are filled with a different number of facemasks.

4. The method as in claim 1, further comprising rotating individual facemasks on the rotary wheel conveyor with the pick-up devices as needed to ensure that the facemasks are deposited into the carton in an alternating stack pattern.

5. The method as in claim 1, wherein the facemasks are in an initial offset configuration on an upstream conveyor, and further comprising aligning the facemasks along a common conveying axis by removing the offset between adjacent facemasks as the facemasks are conveyed along the production line prior to reaching the rotary wheel.

6. The method as in claim 1, wherein the pick-up devices are rotatable vacuum pucks spaced around the rotary wheel conveyor.

7. The method as in claim 1, wherein the pick-up devices are stationary relative to the rotary wheel conveyor such that the facemasks are deposited into the carton in an orientation in which the facemasks were picked up by the pick-up devices.

8. The method as in claim 7, wherein the facemasks are in an initial alternating pattern when picked up by the pick-up devices, and are deposited into the carton in this initial alternating pattern.

9. The method as in claim 8, wherein a reject facemask on the rotary wheel conveyor bypasses the carton and is released from the rotary wheel conveyor at a reject location, and further comprising bypassing the carton with the immediately adjacent facemask on the rotary wheel conveyor so as to keep the alternating stack pattern of facemasks being deposited into the carton.

10. The method as in claim 1,
   wherein upon release from the rotary wheel conveyor, the facemasks are guided into the cartons by guide structure configured at the first staging area.

11. The method as in claim 1, wherein the individual facemasks are wrapped prior to reaching the delivery location.

12. An automated method for stacking and loading facemasks into a carton in a facemask production line, comprising:
   conveying individual facemasks to a delivery location adjacent to a rotary wheel conveyor having a plurality of individual pick-up devices spaced around a circumference thereof;
   as the rotary wheel conveyor rotates by the delivery location, picking up each facemask with a respective pick-up device on the rotary wheel conveyor and transporting the facemasks to a first carton staging area at a first location on the circumference of the rotary wheel conveyor;
   at the first carton staging area, releasing the facemasks from the rotary wheel conveyor and depositing the facemasks into a carton as the rotary wheel conveyor rotates by the first staging area; and wherein a downward force is generated by the pick-up devices and imparted to the facemasks upon releasing the facemasks from the rotary wheel conveyor.

13. An automated method for stacking and loading facemasks into a carton in a facemask production line, comprising:

conveying individual facemasks to a delivery location adjacent to a rotary wheel conveyor having a plurality of individual pick-up devices spaced around a circumference thereof;

as the rotary wheel conveyor rotates by the delivery location, picking up each facemask with a respective pick-up device on the rotary wheel conveyor and transporting the facemasks to a first carton staging area at a first location on the circumference of the rotary wheel conveyor;

at the first carton staging area, releasing the facemasks from the rotary wheel conveyor and depositing the facemasks into a carton as the rotary wheel conveyor rotates by the first staging area;

wherein a downward force is imparted to the facemasks upon releasing the facemasks from the rotary wheel conveyor; and wherein the downward force is a pneumatic force generated by the pick-up devices.

14. A system for stacking and loading individual wrapped facemasks into a carton in a facemask production line, the system comprising:

a rotary wheel conveyor rotatable in a horizontal plane above the individual wrapped facemasks about a vertical axis;

a plurality of individual pick-up devices spaced around a circumference of the rotary wheel conveyor;

a delivery location adjacent to the rotary wheel conveyor;

a first staging area at a first location on the circumference of the rotary wheel conveyor;

wherein the individual wrapped facemasks conveyed to the delivery location are picked up from above with devices as the rotary wheel conveyor rotates by the delivery location;

wherein the individual facemasks are released from the pick-up devices and deposited into a carton at the first staging area as the rotary wheel conveyor rotates by the first staging area; and a second staging area at a second location on the circumference of the rotary wheel conveyor, wherein when the first carton is filled to a predefined number of the individual wrapped facemasks, the rotary wheel conveyor transports the individual wrapped facemasks to the second staging area for filling a second carton at the second staging area.

15. The system as in claim 14, wherein the pick-up devices are rotatable relative to the rotary wheel conveyor.

16. The system as in claim 14, wherein the pick-up devices are rotatable vacuum pucks spaced around the rotary wheel conveyor.

17. The system as in claim 14, wherein the pick-up devices are vacuum pucks that generate a downward pneumatic force imparted to the individual wrapped facemasks upon releasing the individual wrapped facemasks from the rotary wheel conveyor.

18. A system for stacking and loading individual wrapped facemasks into a carton in a facemask production line, the system comprising:

a rotary wheel conveyor rotatable in a horizontal plane above the individual wrapped facemasks about a vertical axis;

a plurality of individual pick-up devices spaced around a circumference of the rotary wheel conveyor;

a delivery location adjacent to the rotary wheel conveyor;

a first staging area at a first location on the circumference of the rotary wheel conveyor;

wherein the individual wrapped facemasks conveyed to the delivery location are picked up from above with devices as the rotary wheel conveyor rotates by the delivery location; and wherein the individual facemasks are released from the pick-up devices and deposited into a carton at the first staging area as the rotary wheel conveyor rotates by the first staging area; and wherein the pick-up devices are stationary relative to the rotary wheel conveyor such that the individual wrapped facemasks are deposited into the carton in an orientation in which the individual wrapped facemasks were picked up by the pick-up devices.

* * * * *